MAGNETICALLY OPERATED SWITCHES

Original Filed April 3, 1963 2 Sheets-Sheet 1

INVENTOR
John A. Bear
BY
Frank H. Borden
ATTORNEY

MAGNETICALLY OPERATED SWITCHES

Original Filed April 3, 1963 2 Sheets-Sheet 2

INVENTOR
John A. Bear
BY
Frank H. Borden
ATTORNEY

United States Patent Office

Re. 27,077
Reissued Feb. 23, 1971

27,077
MAGNETICALLY OPERATED SWITCHES

John A. Bear, deceased, late of Philadelphia, Pa., by Wharton D. Bear, administrator, Philadelphia, Pa., assignor to Wharton D. Bear, Philadelphia, Pa.

Original No. 3,317,870, dated May 2, 1967, Ser. No. 270,401, Apr. 3, 1963. Application for reissue Apr. 18, 1969, Ser. No. 830,165
Int. Cl. H01h *5/02, 21/00*
U.S. Cl. 335—207 6 Claims

Matter enclosed in heavy brackets [ ] appears in the original patent but forms no part of this reissue specification; matter printed in italics indicates the additions made by reissue.

*ABSTRACT OF THE DISCLOSURE*

*A magnetically operated switch which is operated by snap action and is magnetically locked in the "on" and "off" position to prevent chattering and operation under vibrating conditions. A master and slave unit are provided with an equal number of pairs of poles to operate the switch. The movement of the master unit is greater than the movement of the slave unit by an amount that will provide magnetic repulsion between the units at the ends of the switching motion.*

This invention relates to magnetically operated switches.

It is among the objects of the invention: to improve the art of magnetic switches; to lower the costs of such switches; to provide a magnetically operated switch which is magnetically locked in both on and off positions and is therefore free from chattering or moving in response to blows or vibrations; to provide a magnetic switch which is explosion-proof; to provide a magnetic switch having a snap action both in opening and closing the circuit controlled thereby; to provide a switch the components of which are in both dynamic and static balance without the use of counterweights; to provide a rotary magnetic switch of peripherally uniform and symmetrical flux-couple torque distribution; to provide a magnetic switch comprised of a rotational master or control magnet of minimal angular motion and a complemental slave or captive magnet movable axially to control a circuit selectively in response to either, attraction between unlike or opposite poles, or repulsion between like poles as the control magnet is moved angularly; to provide a rotary magnetic switch comprised of master or control, and complemental slave or captive, magnets of annular form each comprised of multiple poles symmetrically spaced peripherally of the respective magnets whereby the attractive or repulsive torque distribution is uniformly symmetrical, and of enhanced total force; to provide a magnetic switch comprising an oscillatable master magnet having a pivotal axis, and a slave unit which is movable primarily axially of said axis; to provide a wiping switch contact with means for interrupting a leakage path without causing an untoward discontinuity of circuit controlling contact; and many other objects and advantages will become more apparent as the description proceeds.

Illustrative forms of the magnetic switch are disclosed in FIGS. 1 to 8, and FIGS. 12 to 16 of the attached drawings, and an illustrative modification thereof is disclosed in FIGS. 9 to 11.

In the accompanying drawings forming part of this description:

FIG. 1 represents a plan of an illustrative form of switch showing the master, switch-actuating, element externally of the mounting plate, in full lines positioned at position "A," "off," and showing in dash dot lines its position "B," "on," toward both of which positions the master switch unit is forced by magnetic reactions with the slave or captive unit (not shown), to be described, and which also indicates in dashed lines an intermediate transitory position C, between positions A and B, at which magnetic torque between the master and slave unit is neutral.

Figure 1:
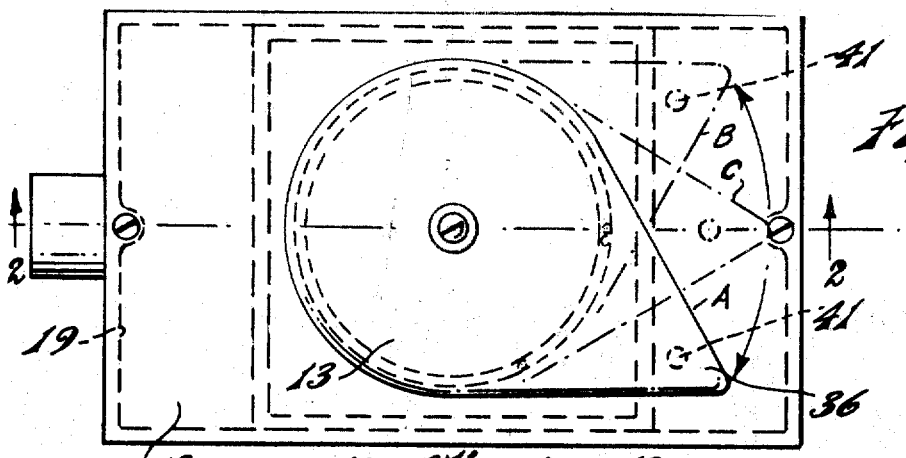
Figure 2:
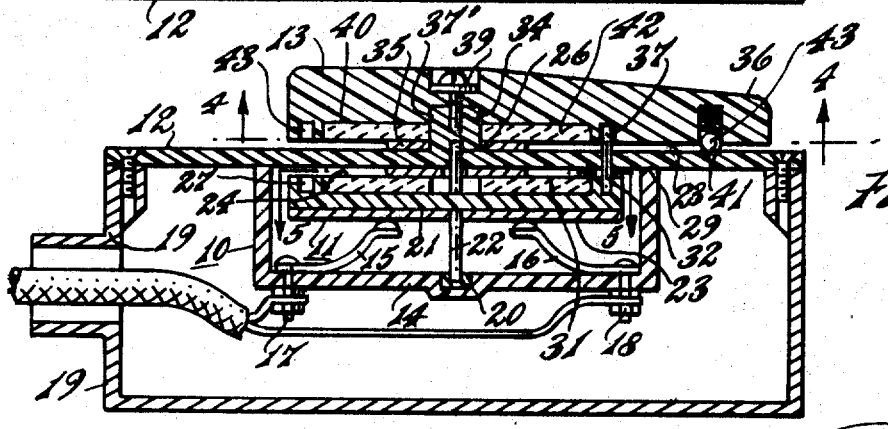
FIG. 2 represents a longitudinal section through the illustrative switch organization of FIG. 1, taken on line 2—2 thereof.
Figure 4:
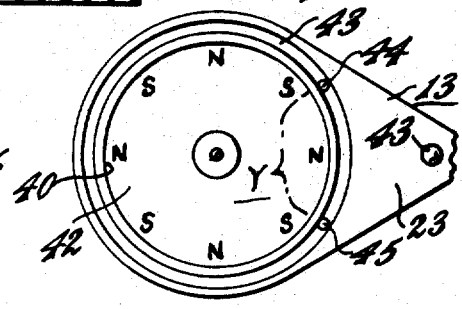
FIG. 4 represents a purely diagrammatic bottom plan of the master or control switch, showing an illustrative eight poles and the spacing y between stops.
Figure 3:
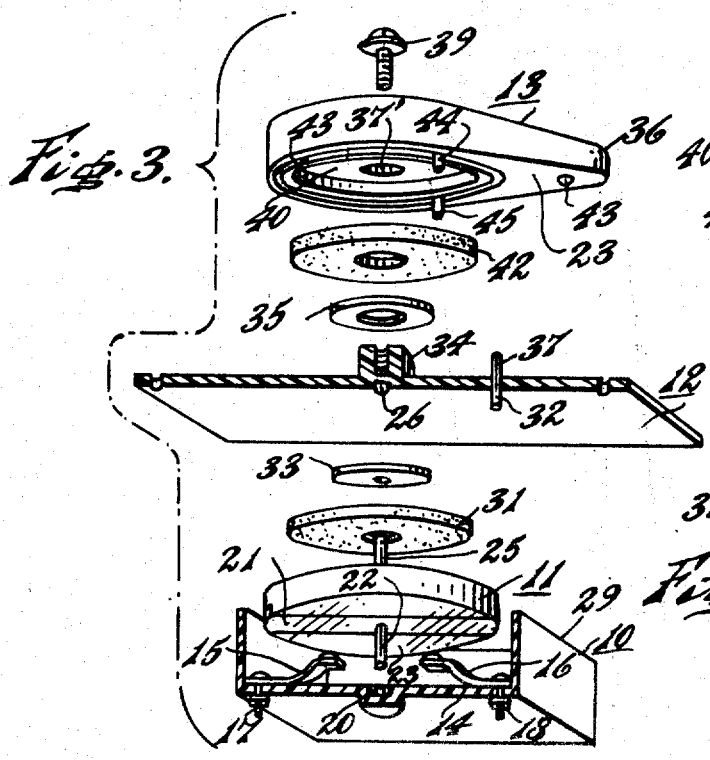
FIG. 3 represents an exploded perspective of the components of the instant illustrative switch.
Figure 5:
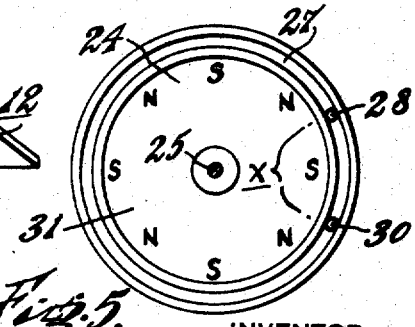
FIG. 5 represents a purely diagrammatic top plan of the slave magnet organization, also showing an illustrative eight poles and the spacing x between stops.
Figure 6:
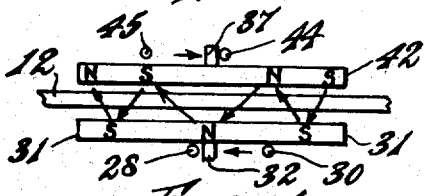
Figure 7:
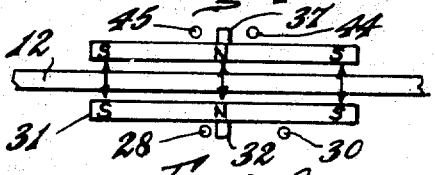
Figure 8:
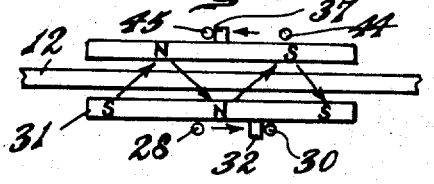

FIGS. 6 to 8, represent purely schematically, in edge elevation, the juxtaposed parallel spaced concentric disc magnets of the master and slave units in their respective several successive relationships incident to angular motion of the slave unit in one organization thereof, and ultimate motion of the slave magnet unit, in which attraction between opposite poles of the respective units establishes magnetic flux couples, and with augmentation by repulsion of like poles, creates the torque force controlling the slave unit, and thus the snap action of the switch.

Figure 9:
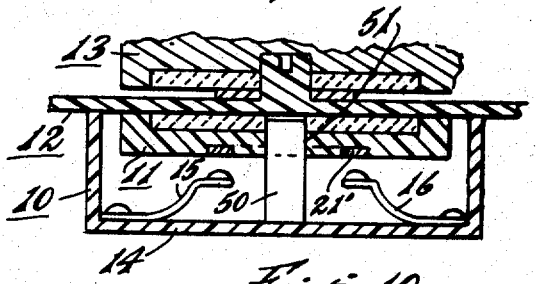
Figure 10:
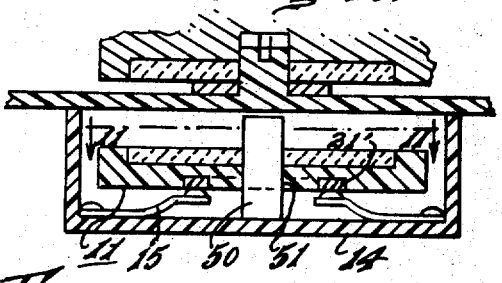

FIGS. 9 and 10 represent schematically the two positions of the magnetic slave unit relative to the oscillatable master or control unit, in which angular motion of the master unit affects axial movement only of the slave unit, on an angular guide post due to repulsion of like poles, and reducing the angular movement of the master or control magnet unit by one-half over the motion essential in the device of the preceding figures.

Figure 11:
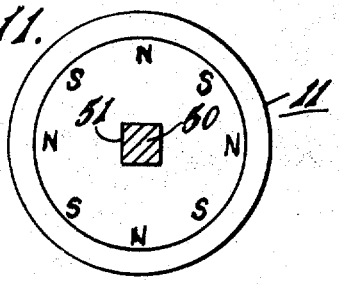

FIG. 11 represents a fragmentary top plan partially in section of the axially movable slave unit of the organization shown in FIGS. 10 and 11, taken on line 11—11 of FIG. 10.

Figure 12:
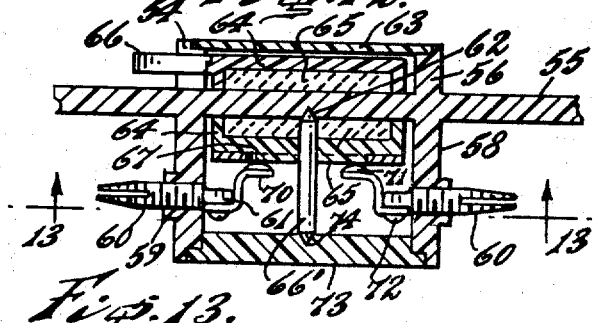

FIG. 12 represents a longitudinal vertical section through a modified form of the invention according to FIGS. 1 to 8, showing the lead-in connections molded into the switch unit, by which the switch is enhancedly explosion proof.

Figure 13:
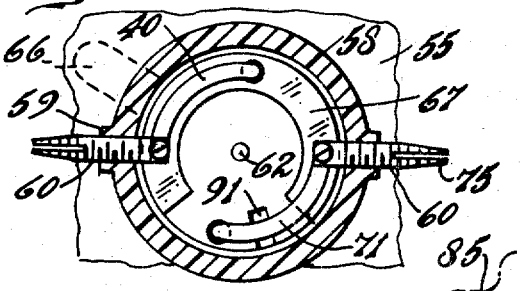

FIG. 13 represents a transverse section taken on line 13—13 of FIG. 12.

Figure 14:
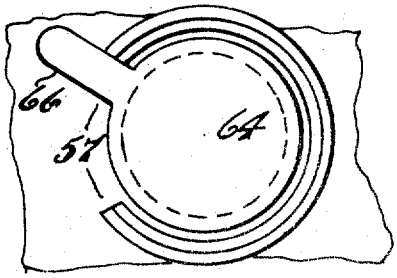

FIG. 14 represents a fragmentary top plan of the switch of FIG. 12 with the cover plate removed.

Figure 15:
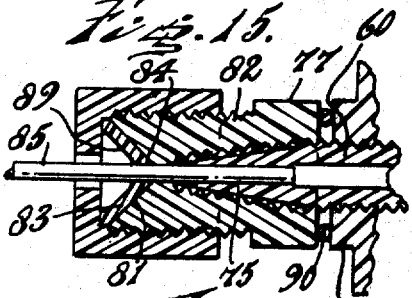

FIG. 15 represents a fragmentary section through the assembly of lead-in wire and the molded lead-in connection to the switch organization of FIG. 12.

Figure 16:
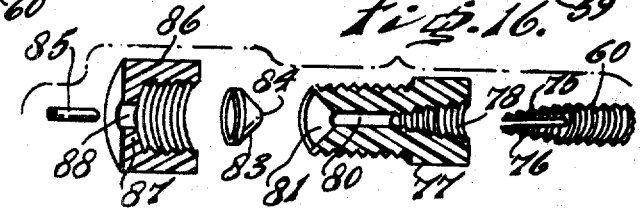

FIG. 16 represents an exploded perspective view of the components of the explosion proof lead-in assembly.

In the illustrative form of efficient and highly economical switch comprising an article of manufacture, shown in FIGS. 1 to 8, the components comprise, a usually molded, housing 10, an angularly movable slave or captive magnetic switch unit 11, pushed vertically downwardly into the housing, a cover plate 12, of non-magnetic material, such as of non-magnetic stainless steel, aluminum, or a suitable plastic, hermetically sealed to the housing 10, and an angularly movable master control unit 13, mounted pivotally externally of the plate 12 for arcuate motion in the plane of and relative thereto. The assembly of these components may be mounted on a junction box or the like 19.

The housing 10 has formed in the lower wall 14 a central journal recess 20, and mounts any desired form of electrical make-and-break contacts, such as blades, or the like. Illustratively these comprise two upwardly and laterally projecting resilient wiping contacts 15 and 16, electrically bonded to hermetically sealed binding posts, respectively 17 and 18, extending through and below the lower wall 14. The side walls of the housing 10 have their upper edges in a common plane 29, usually parallel to the bottom wall 14, for hermetic sealing to plate 12. The sealing is effected after the slave or captive unit 11, to be described, has been placed in the housing 10, bearing lightly against the resilient wiping contacts 15 and 16. After sealing the enclosed space in housing 10 may be evacuated, or charged with inert gas.

The slave unit 11 comprises a cylinder of suitable plastic or other non-magnetic material, having embedded flush with its lower surface 23, a centrally apertured contact strip or arcuate bar 21, through which, or concentric with which, a perpendicular downwardly extending post or stud 22 projects, for anti-friction journalling in the recess 20 in the lower wall 14 of the housing 10.

The wiping contacts 15 and 16 bear against the lower surface 23 of the slave unit, and, in accordance with movements of the latter about the axis of stud 22, engage or disengage contact strip 21, closing or opening the circuit therethrough, as will be clear. The contact strip 21, and the resilient wiping contacts 15 and 16 are illustrative of a circuit controlling organization, for which many others may be substituted.

The upper surface of the slave unit 11 has a peripheral or annular surface groove or recess 24, surrounding a vertical axis pin 25 mounted on or formed with the slave cylinder, extending oppositely to but co-axial with the lower stud 22. The vertical pin 25 is ultimately seated in a closed journal-recess 26 formed in the lower surface of the plate 12. By means of the oppositely extending and seated stud and pin the slave unit 11 is mounted for free anti-friction mounting in the housing, except for the incidental friction of the illustrative wiping contacts 15 and 16 against the lower surface 23, which in view of the angular torque incident on the slave unit, to be described, is so minimal as to be inconsequential. It will be observed that with the journalled axially restrained mounting described there is no significant weight carried by the wiping contact arms. The recited annular surface recess 24 receives and mounts a washer-like, planar, centrally apertured, disc-type of magnet 31, to be described, generally flush with the upper surface of the slave unit. This latter surface is also provided with a peripheral groove or recess 27, in which are mounted stop pins 28 and 30, of given arcuate spacing x. A depending pin 32 is mounted on the lower surface of plate 12 and extends into the peripheral groove 27 between the stop pins 28 and 30, and forms a limiting abutment against which the respective stop pins abut in alternation in oscillation of the slave unit between "on" and "off." Preferably a washer 33, as of nylon or the like, surrounds the upper stud 25 and engages between the lower surface of plate 12 and the upper surface of unit 11, to enhance the anti-friction freedom of the slave unit in angular motion relative to said plate, between limits established by stop pins 28 and 30 relative to abutment pin 32.

The plate 12, in addition to the lower surface downwardly projecting closed bearing recess 26, and the downwardly projecting stop or abutment pin 32, on its upper surface mounts an upwardly projecting internally threaded tubular stud extension 34, closed at the bottom by plate 12. The tubular stud 34 is usually loosely surrounded by a thin washer 35, such as of nylon or the like, of the same diameter as washer 33, imposed against the upper surface of the plate 12. The plate 12 also mounts externally a vertically extending abutment stop stud 37. Usually and economically this latter stop stud is coextensive with the lower projecting abutment stop 32, although these can be separate and angularly relatively displaced entities. When preferred, detent recesses 41—41, or like latches may be formed in the outer face of plate 12.

The switch is completed by the external master or control assembly 13. This comprises a formed mass of non-magnetic material having a central aperture 37', receiving the stud 34, and having a pointer end 36. A screw and washer assembly 39 screwed into threaded stud 34, axially anchors the master unit to plate 12, for oscillation about stud 34. Master unit 13 overlies washer 35 in anti-friction spacing from plate 12. It will be seen that the axis of the master unit in stud 34 is coextensive with the common axis through the slave unit, and the master unit is oscillatable about its axis between graduations "on" and "off," between the respective detent recesses 41—41, when the latter are used, as limited by stop pins to be described alternately engaging abutment pin 37. On the lower surface of the control assembly 13, concentric with the axis of axial aperture 37' is a magnet recess 40, in which is disposed the disc-like washer type magnet 42, complemental and parallel to the magnet 31 of the slave unit, although spaced therefrom by the non-magnetic plate 12. If desired a spring-pressed ball detent 43 is disposed for extension beyond the lower surface of the master unit, as in the pointer extension 36, for alternate seating at extreme settings in the detent recesses 41—41. Any other latch or detent organization can be used to hold the master unit in an attained position, augmented by the force of the multiple magnetic flux couples, to be described, incident thereon. The lower surface of the control unit 13 has a peripheral groove 43 in which are disposed stop pins 44 and 45, in angular spacing y. The abutment pin 37 on the upper side of the plate 12 extends into the peripheral groove 43 between the stop pins 44 and 45 to limit the angular motion of the control unit 13. It is essential that the angular spacing x between stop pins 28 and 30, limiting the angular range of motion of the slave unit, be less than the angular spacing y between the stop pins 44 and 45 of the master unit. This insures that the angular motion of the control unit, in moving between "on" and "off" positions, is somewhat greater than that of the slave unit, in its controlled motion between abutment of the depending pin 32 by its respective stop pins 28 and 30. This is important in the preferred organization and operation of the switch, as will develop.

The magnets 31 and 42 of the respective slave and control units are usually identical, and each has at least four poles, and preferably multiples thereof, in place of the bi-polar bar magnets used in prior art magnetic switches. The magnets are preferably of the ceramic type, in which the thickness and diameter vary inversely as the number of poles desired on each magnet increases from four. Therefore, each magnet has a multiplicity of alternate poles evenly and symmetrically spaced about its peripheral extent. For illustrative purpose let it be assumed that each magnet has eight poles. This is disclosed in the plan views of the respective magnets shown in FIGS. 4 and 5. One organization in its functioning is indicated purely schematically in FIGS. 6, 7 and 8.

It being understood that with the master and slave magnets in parallel spaced planes and concentric about a common axis, the unlike poles of the respective magnets establish flux couples in attraction, indicated in FIGS. 6 to 8 by the generally upwardly vertical arrows pointing toward the control magnet, whereas the flux couples in repulsion between like poles are indicated by the generally downward vertical arrows pointing toward the slave magnet. In FIG. 6 the control magnet has been moved to the right, in FIG. 1, clockwise until in this "off" position abutment stop 37 has been tightly engaged by stop pin 44 of the movable master unit. At the same time slave unit magnet 31 and the mounting unit thereof have been moved counterclockwise until the stop abutment 32 has been tightly engaged by stop pin 28 of the slave unit. This relative angular positioning has been established and maintained by the inclination, relative to the axial, of the force vectors of the flux couples, both in attraction and repulsion, symmetrically distributed about the peripheries of the respective magnets. These force vectors arranged all about the peripheries of the respective magnets exert a torque force of considerable magnitude on both magnets, holding them in their then established attitudes, consonant, illustratively, with the controlled circuit being "off." Owing to the multiplicity of controlling couples in their symmetrical spacing about the peripheries of the magnets, there is no resultant force transverse of the pivots of the slave unit urging the latter out of its journalled freely rotatable disposition, and imposing frictional force thereon making it unbalanced, in the intermediate position of the master unit, as shown in FIG. 7. It will be seen also that the total torque on both units holds them in their established setting, against movement under vibration or impacts, as indicated in FIG. 8.

When the master unit 13 is turned on its axis to and through a mid-position "C," the unlike poles of the respective magnets are separated, attenuating the attraction flux couples previously existing, while axially straightening the repulsion force vectors so that these are purely vertical and have no torque component on either magnet, but only axial forces. This is indicated in FIG. 7.

Finally, as indicated in FIG. 8 the master magnet having swung from mid-position, to a point at which the new repulsion flux couples are established and inclined, while new inclined attraction flux couples are established between unlike poles, exerting opposite torque on both magnets, causing both units to snap to the final "on" position indicated in FIG. 8, in which the circuit is closed with a snap, and the master unit is forced to engage stop 45 by abutment 37, and the slave unit is forced to engage abutment 32 against pin 30. This establishes a snap, arc-reducing movement of the slave unit controlled circuit controlling elements. This same snap action maintains in movement of the master and slave units to the "off" position.

It will be seen that regardless of the speed of angular motion of the master unit, it is subjected to resisting force at the start, decreasing to no resisting force and finally to snap action force in its direction of movement.

An important feature of the invention is to provide the angularly movable master magnetic unit, as broadly disclosed, in conjunction with an angularly restrained but primarily axially movable slave magnetic unit. This is schematically indicated in FIGS. 9, 10 and 11. In this case the master unit 13 is of the same structure as previously described, angularly movable relative to the plate 12, and the later, or the lower base 14, mounts a vertical, fixed, angular stud (or guide) 50. This stud may be helical when combined vertical and angular movements may be desired. The slave unit 11, of the same general organization as previously described, has a central angular aperture 51 embracing, and slidable upon, stud 50. Any desired switching components are provided controlled by slave unit motion which are closed, when the slave unit is forcibly moved downwardly away from the plate 12 under magnetic repulsion forces and which are opened when the slave unit moves upwardly by magnetic attraction, or vice versa. For purely illustrative purposes let it be assumed that the resilient contacts 15 and 16 are mounted in the housing having the floor 14, and that the slave unit has the same bridging bar or the like, such as an arcuate bar 21' in its lower surface. FIG. 11 indicates generally the relationship of the slave unit to the angular stud or rod 50. FIG. 9 indicates the upward positioning of the slave unit when the juxtaposed poles of the master and slave units are unlike. This, illustratively, is the off, or circuit-open position. FIG. 10 indicates the maximum repulsive force of like poles of the complemental magnets, causing maximum axial movement of the slave unit, closing (or opening) the circuit.

It will be understood of the latter form of the invention, FIGS. 9 to 11, that the master or control magnet, movable angularly, has only to move between a position in which unlike poles of the master and slave are axially juxtaposed or a position in which like poles are in axial juxtaposition. The first organization urging the magnets together and raising and holding the slave magnet unit in its highest point on the stud 50, which point may mark the opening or closing of the circuit controlled thereby, according to the contact arrangement. The second organization urging the magnets apart to cause the slave unit to assume its lowest position on the stud 50, with appropriate effects upon the contacts and the circuit controlled thereby. It will be seen that the angular movement of the master or control magnet is thus reduced by one-half, with corresponding advantage in attaining small control movements. In this latter type of switch actuator it is preferred that some sort of latch or detent be provided holding the master unit in each of its two positions. Illustratively, it may comprise the spring-pressed detent ball 43 seating alternately in surface recesses previously described. The same sort of detent may be provided, as by a spring-pressed detent ball extending diametrically of the slave unit and movable between detent recesses on the inner surface of the wall of the housing, or the like, juxtaposed thereto: This minimizes the effects of vibration and shocks toward dislodging the slave unit or its controlled contacts.

An important modification of the device previously discussed is shown in FIGS. 12 to 16. This form of the invention is simpler to manufacture and has enhanced explosion-proof characteristics. As shown in FIG. 12 in section a unitary molding of suitable plastic is formed comprising a plate 55 having on its upper surface a short open mouthed annular guide 56, having a lateral opening 57, and having on its lower surface an open mouthed tubular housing 58, and suitable stop pins (not shown). In diametric alignment the tubular portion 58 incorporates hollow chuck elements 60 extending from flat faced bosses 59, and having apertured flattened inner ends 61 within the housing. Within the housing the plate has a journal recess 62, which may be disposed in a raised vertical short stud (not shown) for maintaining the strength of the plate molding. The open end of the short annular guide is closed, eventually, by a plastic circular disc 63, bonded to the end of the annular guide 56, after the insertion of the master unit 64, within the annular guide. The master unit mounts the master magnet 65, similar to that previously described, and has a narrow handle extension 66 extending laterally through opening 57. Opening 57 by its lateral definitions determines the range of motion y of the master unit in a plane close to the outer plane of plate 55, between "on" and "off." The master unit may have pivotal mounting, but as guided within the confines of the guide 56 and held in by the sealing plate 63, the general anti-friction mounting of the master unit is secured without an actual pivotal pin.

An oscillatable slave unit 64, similar to that already described, mounting the magnet 65, is provided concentric with a shaft 66', and in its lower surface mounts an arcuate or linear contact strip 67. In assembling the switch the slave unit 64 is dropped into the open mouth of the tubular housing 58 with the end of shaft 66 entered into the bearing opening 62. Then spring contact elements 70 and 71 are mounted on the flat ends of the chuck elements 60, by screws or the like 72, forcing the ends of the contacts against the lower surface of the slave unit. Finally the open end of the tubular member 71 is closed and hermetically sealed by the cover plate 73 having the journal recess 74, into which the juxtaposed end of shaft 66 is fitted. This establishes free anti-friction rotation of the slave unit within the housing 58, only reduced by the friction of the spring contact members 70 and 71, which is minimal. Any suitable stop or detent means are provided to limit the oscillation of the slave unit through a range x.

Part of the problem in explosion-proofness is the creation of a spark-free organization for the lead-in wire, such as wire 85. To this end the chuck 60 is axially bored with a wire receiving passage 74 and has a threaded tapered end 75 formed with axial slots 76 so that the end is subject to constriction toward the axial passage 74. A plastic constricting nut 77 is provided having an internal tapering threaded surface 78 leading into an axial wire-receiving bore 80 merging into a flaring or internally sloping terminal end surface 81. The constricting nut 77 has suitable angularity for wrench-tightening and has an externally threaded shank 82. A resilient externally tapered washer 83 is provided formed, for instance, of neoprene, having an axial opening 84 such as to slidably receive the lead-in wire 85. This may be relatively solid, or formed with a dished external surface 89. Finally an internally threaded nut 86 having a shoulder 87 and wire-receiving bore 88 is provided for threaded movement on threaded shank 82. A resilient O-ring or the like washer 90 is imposed against the surface of boss 59, for contact and constriction by the advancing end of constricting nut 77.

To minimize the establishment of a leakage path, a recess 91 is provided across which the impinging contact 71 relatively passes in the motion of the slave magnet.

With the threaded portions and the O-ring 90, more or less loosely engaged and the tapering resilient washer 83 juxtaposed in one direction to the tapering terminal surface 81, and to the shoulder 87 of nut 86 in the other, the lead-in wire 85 is pushed axially inward through the bore 88 of the nut, through the axial aperture 84 of the washer, through bore 88 and into bore 74 in the chuck element 60 in the uncompressed chuck element. The plastic constricting nut 77 is then tightened against the O-ring 90 by movement on tapered threaded portion 76, forcing the tapered end of the chuck element into tight constriction on the wire, anchoring the wire. The nut 86 is then tightened on shank 82 compressing the tapered washer axially between the shoulder 87 and the tapered surface 81 and forcing the washer into tight hermetic seal against the wire.

It will be seen that within the broad purview of the invention many changes and modifications may be made without departing from the spirit of the invention, and all such are to be construed as within the scope of the invention as recited in the appended claims.

I claim as my invention:

1. A magnetic switch comprising a slave unit, means journalling the slave unit for rotative oscillation only on an axis, said slave unit comprising an annular slave magnet concentric with said axis and having multiple poles evenly distributed about the periphery of the magnet, switch means controlled by motions of the slave unit, a master control unit in juxtaposed proximity to said slave unit having an axis co-extensive with the axis of said slave unit, said master unit comprising an annular master magnet concentric with said axis and having multiple poles evenly distributed about its periphery and having the same diameter and the same number of poles as the slave magnet, said master unit being rotatably oscillatable only whereby flux magnetic couples are established between the poles of the master magnet and the poles of the slave magnet in attraction and repulsion respectively to effect snap action of the slave unit in closing and opening the circuit through the switch means.

2. A magnetic switch comprising a support, master and slave planar magnet units each having the same diameter and the same number of multiple poles coaxially journalled in the support in effectively confronting axial registration for parallel axially fixed respective rotative oscillations, circuit controlling means on the support in operative relation to said slave unit operated between open and closed functionally with positioning of said slave unit, stop means on the support respectively limiting the rotative oscillations of said master and said slave unit to ranges of the latter within which the circuit controlling means is opened and closed, whereby with the master unit at one limit of its oscillation first flux couples between poles of the respective units creates torque on the slave unit forcing it to one limit of its oscillation while simultaneously forcing the master unit toward its said one limit, and whereby rotation of the master unit towards its other limit disrupts the first flux couples and after passing a neutral no-torque-juxtaposition of poles of the respective units develops second flux couples establishing torque on the respective units forcing the master unit against its said other limit while forcing the slave unit toward and against its other limit establishing a snap action of both units in both directions of oscillation.

*3. A magnetic switch comprising a housing, a slave unit mounted for movement between a pair of positions in said housing, circuit controlling means responsive to movement of the slave unit to said positions to open and close a circuit, said slave unit comprising an annular magnet having multiple poles distributed about the periphery thereof, a master control unit mounted for oscillation juxtaposed in proximity to said slave unit and comprising an annular magnet having multiple poles distributed about its periphery and juxtaposed over the slave magnet, all said poles of said slave and master units being of opposite polarity when the units are positioned midway their limits of travel.*

*4. A magnetic switch as defined in claim 3 wherein the range of motion of the master unit is greater than that of the slave unit.*

*5. A magnetic switch comprising a housing, a slave unit mounted for movement between a pair of positions in said housing, circuit controlling means responsive to movement of the slave unit to said positions to open and close a circuit, a master control unit mounted for oscillation juxtaposed in proximity to the slave unit, magnetic means coupling the units for driving the slave unit by the master unit, said magnetic means comprising a plurality of pairs of poles mounted on each unit, all the poles of said slave and master units being of opposite polarity when the units are positioned midway their limits of travel.*

*6. A switch as defined in claim 5 wherein the range of motion of the master unit is greater than that of the slave unit.*

References Cited

The following references, cited by the Examiner, are of record in the patented file of this patent or the original patent.

UNITED STATES PATENTS

| | | | |
|---|---|---|---|
| 2,843,698 | 7/1958 | Knauth | 335—207 |
| 2,896,043 | 7/1959 | Andrews | 335—207 |
| 2,951,135 | 8/1960 | Ovshinsky | 335—207 |
| 3,025,372 | 3/1962 | Benson | 335—207 |
| 2,100,824 | 11/1937 | Wayman | 174—65.1 |
| 2,477,172 | 7/1949 | Brownlow | 174—65.1 |
| 2,980,777 | 4/1961 | Howell et al. | 200—87 |
| 3,114,809 | 12/1963 | Benson | 200—87 |

BERNARD A. GILHEANY, Primary Examiner

R. N. ENVALL, JR., Assistant Examiner